United States Patent
Yarmus

(10) Patent No.: US 9,292,550 B2
(45) Date of Patent: Mar. 22, 2016

(54) FEATURE GENERATION AND MODEL SELECTION FOR GENERALIZED LINEAR MODELS

(71) Applicant: ORACLE INTERNATIONAL CORPORATION, Redwood Shores, CA (US)

(72) Inventor: Joseph Yarmus, Groton, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 350 days.

(21) Appl. No.: 13/772,852

(22) Filed: Feb. 21, 2013

(65) Prior Publication Data

US 2014/0236965 A1    Aug. 21, 2014

(51) Int. Cl.
G06F 7/00 (2006.01)
G06F 17/30 (2006.01)

(52) U.S. Cl.
CPC ................... *G06F 17/30312* (2013.01)

(58) Field of Classification Search
None
See application file for complete search history.

(56) References Cited

U.S. PATENT DOCUMENTS

| | | | |
|---|---|---|---|
| 2004/0073475 A1* | 4/2004 | Tupper | 705/10 |
| 2007/0179966 A1* | 8/2007 | Li | G06F 17/30539 |
| 2007/0185896 A1* | 8/2007 | Jagannath et al. | 707/102 |
| 2007/0192341 A1* | 8/2007 | Thomas | G06F 17/30545 |
| 2011/0307303 A1* | 12/2011 | Dutta et al. | 705/7.42 |
| 2012/0072781 A1* | 3/2012 | Kini et al. | 714/47.3 |

OTHER PUBLICATIONS

Foster et al.; "The Risk Inflation Criterion for Multiple Regression", from the Annals of Statistics, vol. 22, No. 4; (http://projecteuclid.org/DPubS/Repository/1.0/Disseminate?view=body&id=pdf_1&handle=euclid.aos/1176325766) (1994), pp. 1947-1975.

Cheng et al.; "Automated Feture Generation from Structured Knowledge", Oct. 2011, CIKM'11: Proceedings of the 20th ACM Intl. Conference on Information and Knowledge Management; (http://research.microsoft.com/pubs/151946/cikmfp0337-cheng.pdf) pp. 1-10.

Zhou et al.; "Streamwise Feature Selection", from Journal of Machine Learning Research 7 (2006); (http://jmlr.csail.mit.edu/papers/volume7/zhou06a/zhou06a.pdf) pp. 1861-1885.

(Continued)

*Primary Examiner* — Robert Beausoliel, Jr.
*Assistant Examiner* — Michael Pham
(74) *Attorney, Agent, or Firm* — Kraguljac Law Group, LLC

(57) ABSTRACT

Systems, methods, and other embodiments associated with feature generation and model selection for generalized linear models are described. In one embodiment, a method includes ordering candidate features in a dataset being considered by a streamwise feature selection process according to an inclusion score that reflects a likelihood that a given candidate feature will be included in the GLM. The ordered candidate features are provided to the streamwise feature selection process for acceptance testing. In one embodiment, the method also includes selecting penalty criterion for use in the acceptance testing that is based on characteristics of the dataset.

38 Claims, 6 Drawing Sheets

(56) References Cited

OTHER PUBLICATIONS

Wu et al.; "Online Streaming Feature Selection", Proceedings of the 27th Intl. Conference on Machine Learning (ICML-10, Jun. 21-24, 2010, Haifa, Israel; (http://www.icm/2010.org/papers/238.pdf); pp. 1159-1166.

Foster et al.; Streaming Feature Selection using Alpha-Investing; 2005 Proceeding of the Eleventh ACM SIGKDD International Conference on Knowledge Discovery and Data Mining (Chicago, IL. USA, Aug. 2005); (http://citeseerx.ist.psu.edu/viewdoc/summary?doi=10.1.1.145.7699); pp. 384-393.

Singh et al.; Parallel Large Scale Feature Selection for Logistic Regression, SDM, 2009; (http://people.cs.umass.edu/~sameer/files/parallel-sdm09-ppt.pdf) pp. 1-25.

Benjamini et al.; "A Simple Forward Selection Procedure Based on False Discovery Rate Control", from the Annals of Applied Statistics, vol. 3., No. 1, (2009) DOI: 10.1214/08-AOAS194; pp. 1-21.

Benjamini et al.; "Controlling the False Discovery Rate: A Practical and Powerful Approach to Multiple Testing", Journal of the Royal Statistical Society. Series B (Methodological), vol. 57, No. 1. (1995); (http://engr.case.edu/ray_soumya/mlrg/controlling_fdr_benjamini95.pdf) pp. 285-300.

Akaike, H.; Information Theory and an Extension of the Maximum Likelihood Principle; V. Petrov and F. Csake (Eds.), International Symmposium on Information Theory, Budapest. Akademiai Kiado (1973) (http://citeseerx.ist.psu.edu/viewdoc/summary?doi=10.1.1.55.7181) pp. 1-10.

* cited by examiner

FEATURE GENERATION AND MODEL SELECTION FOR GENERALIZED LINEAR MODELS

BACKGROUND

The generalized linear model (GLM), and specifically the GLM subclasses linear and logistic regression, are an important set of statistical models. GLMs are constructed for datasets that include input attributes and a target attribute that is the subject of the modeling process. GLM extends the methods of ordinary linear regression to target attributes that are not necessarily normally distributed with constant variance over their range, such as counts, or membership in a category. The target attribute is connected to a linear response via a link function and the variance can be specified as a function of the predicted mean. The datasets can be large and include many input attributes. In addition candidate features can be constructed from the input attributes and used to augment the input attributes used by the modeling process to predict the target attribute. Features are functions of the input attributes such as products and powers of input attributes. GLM has broad application as both a descriptive and predictive tool across many industries including epidemiology, finance, economics, marketing and environmental science. The wide applicability of GLM is due to its simplicity and interpretability, including a well-used and well-studied group of diagnostics.

As the size of a dataset being modeled increases, GLM suffers significant drawbacks. GLM, in its standard form, is computationally intensive, with approximately cubic scaling. The number of possible multi-attribute combinations explodes as the number of attributes increases. For example, two hundred input attributes yields 40,000 pair-wise candidate features and eight million triplet combination features. Multicollinearity, in which one or more attributes are highly correlated, causes numerical instability in the GLM. In the absence of specific efforts to avoid it, the likelihood of encountering multicollinearity increases with the number of attributes. Furthermore, interpretability of the GLM declines as the number of attributes increases.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
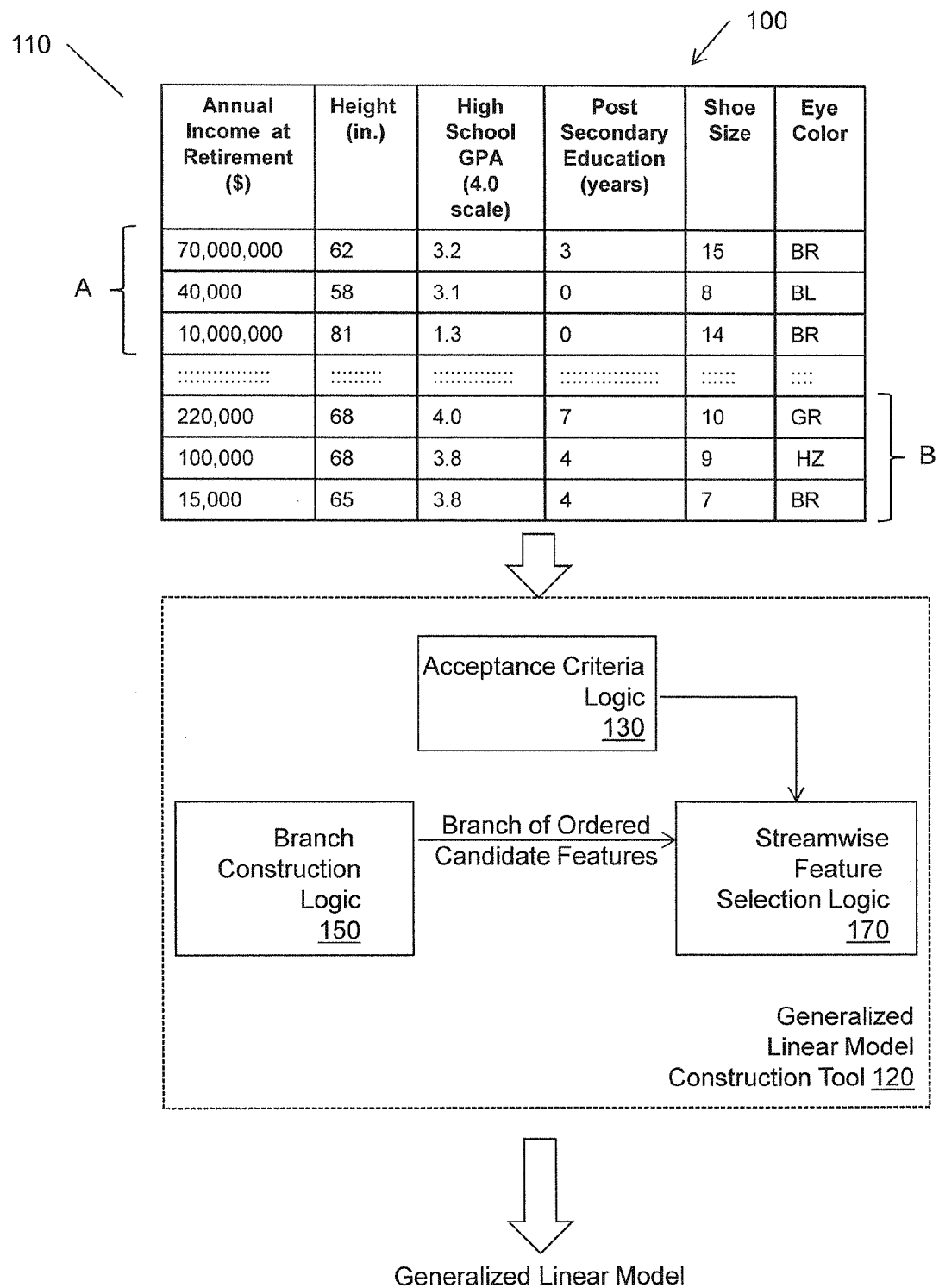
FIG. 1 illustrates one embodiment of a system associated with feature generation and model selection for GLMs.

Automated approaches to resolving the scaling issues with GLM have a long history, and have produce mixed results. Most automated GLM techniques are computationally inefficient and do not scale to high dimensional input. Popular GLM methods include stepwise, forward selection, backward elimination, or subset selection approaches to determining a GLM, in a process called "model selection" or "feature selection". Forward selection begins with an empty model and at each step adds in the attributes that contribute the largest increase to a figure of merit, such as F-value. Backward elimination starts with a complete set of attributes and removes the attribute with the largest P-value, (i.e., the attribute that is most likely to be a non-contributor). Stepwise interleaves forward selection and backward elimination. Best subset compares all subsets of a given model size, as chosen by an analyst, and selects the best subset according to some figure of merit (e.g., Akaike Information Criterion (AIC), Bayesian Information Criterion (BIC), or cross-validated error.

Existing GLM methods suffer from several general problems. First, they construct all candidate features prior to starting the feature selection process. Second, they are computationally intensive, building many models at each step. Third, as more models are constructed during model selection, the likelihood increases that one of the models will appear to predict the target attribute just by random chance (known as the Bonferroni problem). Streamwise feature selection is a principled approach to forward selection that attempts to address these problems. Features can be constructed singly and then subjected to feature selection. To reduce computational intensity, in streamwise feature selection, a single candidate feature (e.g., an input attribute or combination of multiple input attributes) is considered at each step. To avoid the Bonferroni problem, an adaptive penalty is applied against the acceptance of new features.

Systems and methods are described herein that extend the streamwise feature selection method to provide efficient and scalable model selection for GLM. Branches of candidate features are scored with respect to their probable value to the GLM (e.g., a candidate features correlation with the target attribute in the case of a numerical target attribute). Candidate features within a branch are considered by the streamwise feature selection method in order of score. In addition, statistical hints are derived from the dataset to determine an appropriate adaptive penalty function for the streamwise feature selection method. The statistical hints are also used to determine when to re-order candidates within a branch, when to terminate feature selection within a branch and construct a new branch, and when to terminate the feature selection process.

Ordering candidate features as described herein causes the streamwise feature selection process to first consider the most likely candidate features, leading to computational efficiency. To facilitate selection of a compact model, remaining candidate features are re-ordered as the model grows. To update the order of remaining candidate features, correlations are measured with respect to model residuals (errors) to avoid adding candidate features whose contribution to the target attribute is redundant with respect to the candidate features already in the model.

The ordering of candidate features leads to natural termination criteria. If there are no statistically significant feature-target correlations, then the model build may be terminated. Because the re-ordering of candidate features is performed with respect to residuals, an upper bound on the improvement in model accuracy with respect to a given candidate feature can be computed (assuming that the candidate feature's contribution is independent and additive). If the computed improvement associated with the top ranked candidate feature is insufficient to overcome the penalty, then the model selection process can be terminated.

Another natural termination condition resulting from ordering is the number of consecutive candidate test failures. With random ordering of attributes, a good candidate could appear at any time. With statistical-information based ordering, the probability of finding a good candidate feature declines as the number of consecutive failures increases.

In addition to providing adaptive feature ordering and penalty criteria, the methods and systems herein may be implemented using datasets or structures that facilitate efficient caching. An automated tool may provide an interface for performing the methods described herein to assist a non-expert in selecting a GLM with minimal input from the non-expert.

With reference to FIG. 1, one example embodiment of a system 100 associated with feature generation and model selection for GLMs is shown. The system 100 includes a GLM construction tool 120 configured to construct a GLM that models a dataset 110. The dataset 110 stores records having values for multiple attributes: annual income at retirement, height, high school GPA, post-secondary education, shoe size, and eye color. The dataset 110 may be a relational database table or view. One of the attributes is selected as a target attribute for a GM.

For example, a GLM may be constructed that predicts an annual income at retirement as a function of the other five attributes. For the GLM, annual income at retirement is the target attribute and the other five attributes are input attributes. Annual income, height, GPA, post-secondary education, and shoe size are numerical attributes because they have numerical values. Eye color is a categorical attribute because it has a value that falls into one of a discrete number of categories (e.g., brown, blue, green, and hazel). Combinations of input attributes' values such as products of different input attribute values or input attribute values raised to an exponent are called "features." Input attributes taken by themselves can also be features. The GLM output by the GLM construction tool 120 will combine selected features to predict the target attribute.

The GLM construction tool includes a streamwise feature selection logic 170 that considers candidate features, one at a time, for inclusion in the GLM. Branches of ordered candidate features are constructed by a branch construction logic 150. As will be described in more detail below, the branch construction logic 150 orders (and reorders) candidate features based on a likelihood that each given candidate feature will be included in the GLM. The branch construction logic 150 provides the branch of ordered candidate features to the streamwise feature selection logic 170.

The streamwise feature selection logic 170 is configured to construct the GLM by performing acceptance testing on candidate GLMs. The candidate GLM includes a next candidate feature in the branch currently under consideration. The candidate GLM is compared to a last accepted GLM and a candidate GLM is accepted when acceptance criteria are met. When model construction is terminated, a last accepted GLM is output by the generalized linear construction model construction tool 120.

One potential drawback to considering ordered candidate features in a branch is that the Bonferroni problem may be re-introduced into the streamwise feature selection process. Also, it has been observed that ordering by correlation to the target attribute can cause certain penalty criteria to become ineffective, allowing spurious candidate features to be included in the selected model. These problems can be ameliorated by partitioning the dataset so that one partition (e.g., partition A) is used for ordering the candidate features and the other partition (e.g., partition B) is used for testing candidate models.

In one embodiment, partitioning can be implemented as follows. For datasets with 50 input attributes or less, at most 500 rows per input attribute or half of the available data are allocated to partition A, which is used for branch construction. With more than 50 input attributes, at most 12,500 rows or half of the available data is allocated to partition A. These heuristics trade-off the need for accurate ordering statistics for the power of the acceptance testing process. Experience indicates that typical discovered models often include less than 50 input attributes. At the end of the feature generation and selection process, a model is constructed using all of the training data (e.g., both partitions A and B).

Constructing Ordered Branches of Candidate Features

Figure 2:
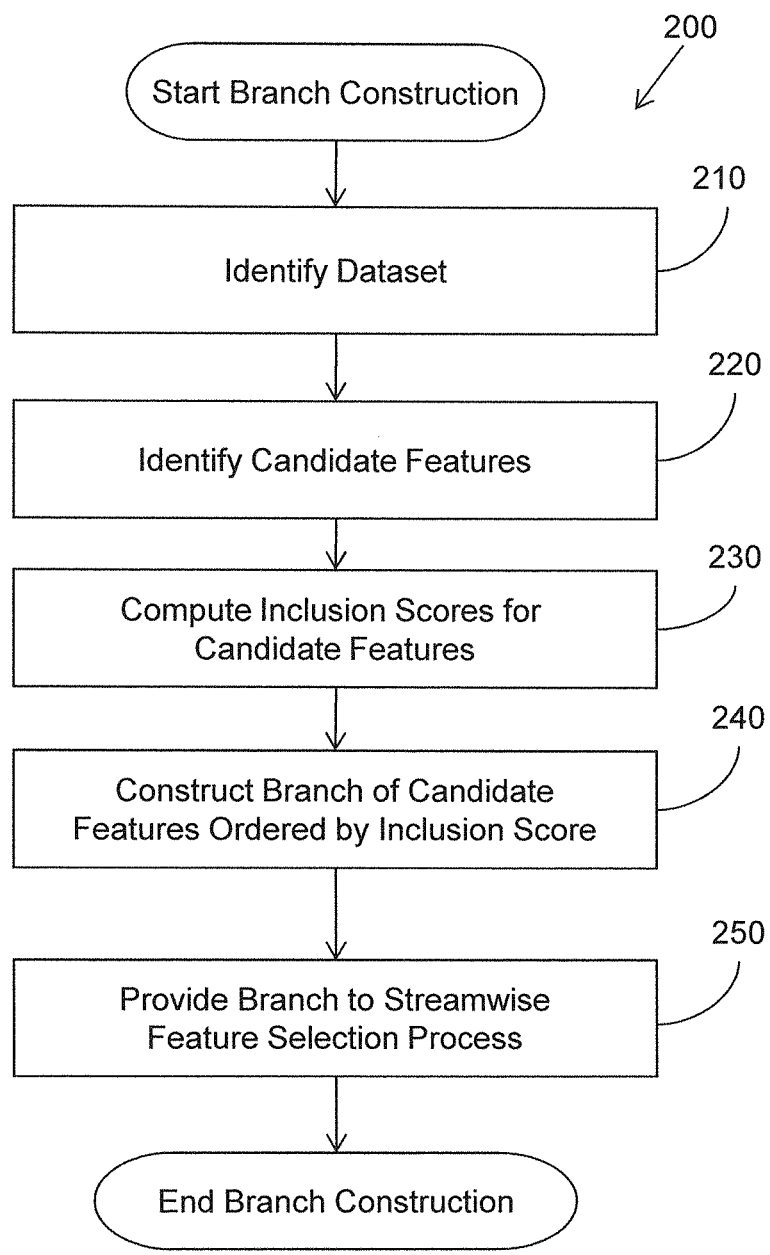
FIG. 2 illustrates an embodiment of a method associated with feature generation and model selection for GLMs.

The branch construction logic 150 constructs branches of candidate features in an ordered manner. FIG. 2 illustrates one example embodiment of branch construction method 200 that may be employed by the branch construction logic 150 to construct a branch of ordered candidate features. At 210, a dataset being modeled is identified. In some embodiments, the dataset is partitioned so that one partition is used for branch construction and the other partition is used for acceptance testing.

At 220, candidate features are identified, and in some cases generated. In one embodiment, the branches increase in complexity. For example, a first set of branches may include candidate features that are simply the input attributes themselves, a second set of branches may include generated combinations of two input attributes, a third set of branches may include triplet combinations, and so on. Thus, a set of candidate features appropriate to the branch being constructed is identified or generated to be scored and possibly included in the branch (e.g., first order candidate features or second order candidate features, and so on).

At 230, respective inclusion scores are computed for respective candidate features. In the initial branch of candidate features, the inclusion score for a candidate feature is based on a notion of correlation of the candidate feature with the target attribute. Later in the model building process, the inclusion score for a candidate feature is based on a notion of correlation with the GLM residuals. Regardless of whether the inclusion score is based on correlation with the target attribute or GLM residuals, the inclusion score expresses the likelihood that the candidate feature will be selected for inclusion in the GLM. The way in which inclusion scores are calculated varies depending on whether the target attribute is numerical or categorical, and may also vary depending on what stage of model construction is being performed.

The inclusion score computed by the branch construction logic 150 is based on correlation between a candidate feature and the target attribute or the residual of the last accepted GLM. In one embodiment, the inclusion scores are computed for candidate features in a single scan of the dataset.

For target attributes having a numerical value, linear regression is used to construct candidate GLMs. For linear regression, the inclusion score for a candidate feature is computed as the magnitude of target-attribute correlation, and its associated t-statistic. The statistical significance of a candidate feature's correlation to the target is equal to the statistical significance of a simple linear regression using the candidate. Thus, this initial inclusion score provides an acceptable heuristic for most favorable ordering.

For target attributes having a categorical value, logistic regression is used to construct candidate GLMs. Categorical target attributes may be characterized as having a dominant target attribute class corresponding to the most prevalent value(s) for the target attribute and one or more rare target attribute classes for less prevalent target attribute values. For logistic regression, the inclusion score for a candidate feature is computed as the t-statistic computed from the sample difference in candidate feature values by target attribute class.

In general, the t-statistics used for logistic regression candidate feature scoring assume unequal variance. However, in two special circumstances other variance estimates may be used for inclusion scoring. First, when the mean and variance of the candidate feature values are both zero for the dominant target attribute value, the pooled variance is used. In this case, the candidate feature is likely to be a highly significant predictor. If a candidate feature is a sparse indicator, the dominant target attribute class may have no positive candidate instances, e.g., 0 out of 1000. However, if the rare target attribute class has some small number of positive instances, e.g., 3 out of 50, the unequal variance test does not reflect the confidence that the candidate feature is a sparse indicator, whereas a pooled variance does. Whenever the mean and variance of the candidate feature are both zero for the dominant target attribute value class, a pooled variance is used because it is expensive to detect whether the candidate feature is in fact a sparse indicator.

Second, when the target attribute distribution is highly skewed and the candidate feature is a sparse indicator, then the mean associated with the rare target attribute class may be zero simply because there are not enough instances compared to the dominant target attribute. To avoid this problem, the dominant and rare target attribute class means are represented at the same level of precision.

In computing the inclusion scores for a branch of candidate features, the branch construction logic 150 may include factors other than just the correlation, such as precision, support, significance, and sparsity. In some embodiments, the inclusion score is set to zero if the inclusion score for a candidate feature value is less than the float.h constant DBL_EPSILON or, if the number of non-zero inclusion scores for a candidate feature is less than a specified minimum, (e.g., n_m=2, in one embodiment). Candidate features having a non-zero inclusion score are placed ahead of all other features. Candidate features that have scores greater than 2, are considered significant.

As a measure of the sparsity of a candidate feature, the candidate feature's non-zero values are counted. If the number of non-zero values is less than a threshold, n_t then the candidate feature is deemed sparse, otherwise the candidate feature is deemed dense. A threshold is used based on a heuristic for the approximate normality of sample centrality measures (e.g., in one embodiment, n_t=25). Sparse candidate features may be less favorable because their statistics have weak support and their impact on the model is likely to be low. Unless other criteria intervene, dense candidate features are given a higher inclusion score than sparse candidate features. After the above criteria have been applied, candidate features are compared on score. For repeatability, candidate features with equal inclusion scores are compared on unique candidate feature ids.

Once a threshold number of candidate features are accepted for inclusion in the GLM, inclusion scores are no longer computed with respect to a correlation to the target attribute. Rather, inclusion scores are computed based on a correlation of the candidate feature with the residuals of the last accepted GLM (i.e., the difference between the actual target attribute values and the values predicted by the GLM). Computing inclusion scores based on correlation with the residuals prevents candidate features having a redundant contribution to the last accepted GLM from being considered before other non-redundant candidate features that may reduce the residuals of the GLM. Specific details about the differences in computing inclusion scores with respect to residuals rather than target attribute values are discussed in more detail below with respect to candidate feature reordering.

At 240, the branch is constructed by ordering the candidate features by inclusion score. Then the branch is subjected to acceptance testing. Acceptance criteria include a figure-of-merit, the log-likelihood, and a penalty to enter. Note that if the figure-of-merit is subtracted from the penalty, the acceptance criteria become a penalized cost. If the penalized cost of a candidate GLM is higher than that of the last accepted model, then the candidate feature will be rejected. If an upper-bound on the figure of merit, and thereby, a lower-bound on the cost and penalized cost exceeds the penalized cost of the last accepted model, the candidate feature can be rejected without even constructing the model. If the candidate features remaining for consideration were ordered by upper-bound on the figure-of-merit, then the search for candidate features on the branch may be terminated.

An arbitrary number of candidate features cannot be included in a branch because as the number of candidate features increases, the t-value becomes unbounded, the sample correlation becomes perfect, and a single, purely random feature is selected. For this reason, the branches constructed by the branch construction logic 150 are of fixed size and, in some embodiments, is based, at least in part, on a number of attributes in the dataset.

At 250, the branch is provided to the streamwise feature selection process for acceptance testing. Since the candidate features are ordered so that the most likely candidate features are considered first, if the first branch candidate feature is not selected for inclusion in the GLM, the candidate features that follow on the branch cannot be selected. Thus, it is reasonable to terminate consideration of the branch. After a relatively small number k of consecutive failures, it is likely that the ordering has become stale or the branch has been exhausted. The branch may be re-ordered or a next branch of candidate features may be constructed, and the streamwise feature selection process resumes. Model construction (and thus branch construction) may be terminated when all candidate branches are exhausted.

Reordering Candidate Features in a Branch

As features are added to the model, correlations among accepted and candidate features can cause the ordering to become stale. The target information in the candidates may be redundant with respect to already included features. Thus, in addition to computing an initial inclusion score for candidate features in a branch as described above, during model construction, steps 230-260 are periodically repeated to update inclusion scores based on the latest GLM residuals and reorder the candidate features in the branch based on the updated inclusion scores. An efficient pathway to candidate feature selection focuses computation on generating and acceptance-testing candidate features only where it is likely to benefit model quality. It is possible to extracts hints from statistical properties of the data and periodically refresh those hints to identify a heuristically most favorable ordering of candidate features.

For scalability, computation of the initial inclusion score and subsequent updated inclusion scores should involve no more than a single scan of an object no larger than the base data. Reordering should be done sparingly, since it is not free. A reordering at every step for linear regression would have the same computational order as standard forward selection.

A reordering at every step for would be an improvement over standard forward selection for logistic regression, because logistic regression requires multiple iterations, but single step reordering may be too costly. The statistical hints include a candidate feature score that reflects likelihood of acceptance if the feature was the next candidate tested. In addition, other factors are considered, such as data sparsity and the precision of the measure.

In one embodiment, reordering of candidate features is performed after some number K candidate features have been accepted (e.g., based on some reorder criteria). The reorder criteria may be a predetermined reduction in model error when a most recent candidate GLM is accepted. The updated inclusion score for a candidate feature is based on a correlation of the candidate feature with the residuals of the last accepted GLM (i.e., the difference between the actual target value attribute values and the values predicted by the GLM for linear regression or the working residuals at the final iteration of the last accepted model for logistic regression).

For numerical target attributes, computing an updated inclusion score for a candidate feature involves replacing the target attribute-correlation for the candidate feature with correlation to the residuals of the last accepted GLM. For categorical target attributes, the differences between target-conditional mean values cannot be computed because the residuals are not categories, but numbers: one minus the predicted probability of the actual target value. To compute updated inclusion scores, candidate features' correlation to the working residuals, which is an output of a GLM model, are used.

GLMs take advantage of linear model methods for cases in which the assumptions, constant variance over the range of values, $-\infty < t < \infty$, are not met. This is accomplished by transforming the target attribute value, applying weights to the rows to rescale the variance, and iterating. The working residuals are the final iteration residuals on the transformed, linear scale. Their distribution is related to that of linear regression residuals. Thus, for categorical target attributes correlation to the working residuals is a sensible choice for computing updated inclusion scores and as a re-ordering metric.

Acceptance Criteria and Penalty Criteria

Returning to FIG. 1, the GLM construction tool 120 includes an acceptance criteria logic 130 that determines acceptance criteria that will be used by the streamwise feature selection logic 170 to decide whether to accept or reject a candidate GLM. In theory, the purpose of the penalty term is to minimize the predictive risk of the discovered model. To allow a user of the GLM construction tool 120 some qualitative control over the initial filtering level, the acceptance criteria logic 130 is configured to offer a selection from a variety of penalty criteria, along with preset default penalty criteria. The preset default penalty criteria include: Akaike Information Criterion (AIC), (Bayesian Information Criterion (BIC), Risk Inflation Criterion (RIC), and α-investing.

The AIC penalty is small at the outset and grows slowly with model size. Relative to the other penalties, it is weak and typically results in larger first phase (pre-pruning) models. Its potential value lies in its relative weakness. For example, with data that is both deep (many rows) and wide (many attributes) it may result in a substantial, although relatively reduced, filtering that can result in a more accurate final model after pruning. However caution is required in the application of this criterion. AIC performs poorly when the number of candidate features "p" (which is related to the number of input attributes) is much greater than the number of rows "n" in the dataset.

The RIC penalty has a dependency upon the number of candidate features. Therefore, as originally conceived, RIC is poorly suited to a streamwise feature selection context. The RIC penalty used by the acceptance criteria logic 130 uses a phased penalty, in which the number of candidate features only reflects the size of the branch currently being explored, with phases defined such that the number of candidate features is never more than the number of input attributes. However, even with phased-RIC, in domains in which $p \gg n$, streamwise feature selection using RIC has been observed to filter all candidates.

The BIC penalty has a dependency on the number of rows. Thus, this criterion has issues with the opposite type of data, many more rows than candidates. Streamwise feature selection with BIC has been observed to filter all candidates in some domains in which $n \gg p$.

α-investing is another penalty criterion choice that was expressly designed for streamwise feature selection. The benefits of α-investing are in a branch-ordered streamwise features selection process may be linked to whether the dataset is partitioned depending on the proportion of true candidates within the top-tier of the order.

The acceptance criteria logic 130 is configured to select a penalty criterion, at least in part, on characteristics of the dataset. In one embodiment, to avoid under-fit during the first phase, by default the acceptance criteria logic 130 chooses BIC when $p > n$, RIC when $n > p$, and α-investing when the number of potential candidate features is large. (in one embodiment, when $p \geq M \equiv 10000$). The choice of default is partially motivated by the fact that BIC and RIC are older criteria and hence likely to be more familiar to users than α-investing. The choice of phased RIC, rather than AIC for the $n > p$ case is due to the fact that AIC performs so poorly when the number of candidate features is much greater than the number of rows. RIC's greater relative filtering strength makes it a more moderate alternative. The user can override the defaults by manually entering penalty criteria to the acceptance criteria logic 130.

The streamwise feature selection logic 170 is configured to use the selected penalty criterion to compute a penalized cost of a candidate GLM. The streamwise feature selection logic 170 accepts the candidate GLM when the penalized cost is less than a penalized cost for the last accepted GLM.

Generating Candidate Features

The branch construction logic 150 generates candidate features from input attributes as needed during branch construction. While an initial branch may be constructed by ordering the input attributes themselves, up to a fixed branch size, by correlation with the target attribute (or GLM residual), subsequent branches, after all input attributes have been constructed, will include candidate features that are a combination of input attributes. In one embodiment, generated candidate features are limited to products of two or three base input attributes. If an input attribute is numeric, then in accordance with standard practice, to avoid correlation with a lower order candidate feature that might be the input attribute or contain it, the mean of the input attribute is subtracted before computing the product.

In one embodiment, a set of branches which include the input attributes is first constructed. Acceptance testing on the first set of branches is concluded before beginning feature generation. A set of second order branches is created by creating a new branch for each accepted input attribute in turn. For each such branch, products with every other input attribute are computed. Inclusion scores for the products are computed. The branch is then ordered according to inclusion score. Acceptance-testing on each of these second order branches is completed prior to constructing third order branches in the three-term product space. For the third order branches, three-way interactions are generated from products of accepted pair-wise candidate features and the input attributes in an analogous manner to the pair-wise search.

For a numeric target attribute, if no input attributes were accepted in acceptance testing of the first branch, candidate features may still be generated. An inclusion score corresponding to a log-square scale correlation of the input attributes and the target attribute is computed. Respective branches are constructed using input attributes with statistically significant correlations on the log-square scale. Each such input attribute in turn, highest scoring first, is paired with the other statistically significant input attributes to form a branch as above. This log-square inclusion score technique to generating candidate features may also be used after the candidate features generated from accepted input attributes have been exhausted.

When a typical row in a dataset has only a small fraction of columns with non-zero values, the dataset is referred to as sparse. In databases, such data is often represented as input attribute name-value pairs in nested columns. Sparse input attributes arise in many analytic applications including text, market basket, product recommendations. A document contains a small subset of words. A basket contains a small subset of items. A consumer has rated a small subset of products. Sparse input attributes need special handling during candidate feature generation because typically the information in such input attributes is highly dispersed among the columns and there are relatively few rows associated with each column (e.g., input attribute). The dispersion makes individual column target-correlations small. The lack of non-zero instances makes the correlation significance threshold for detection high. Thus, this information can easily be missed by the streamwise feature selection process.

Figure 3:
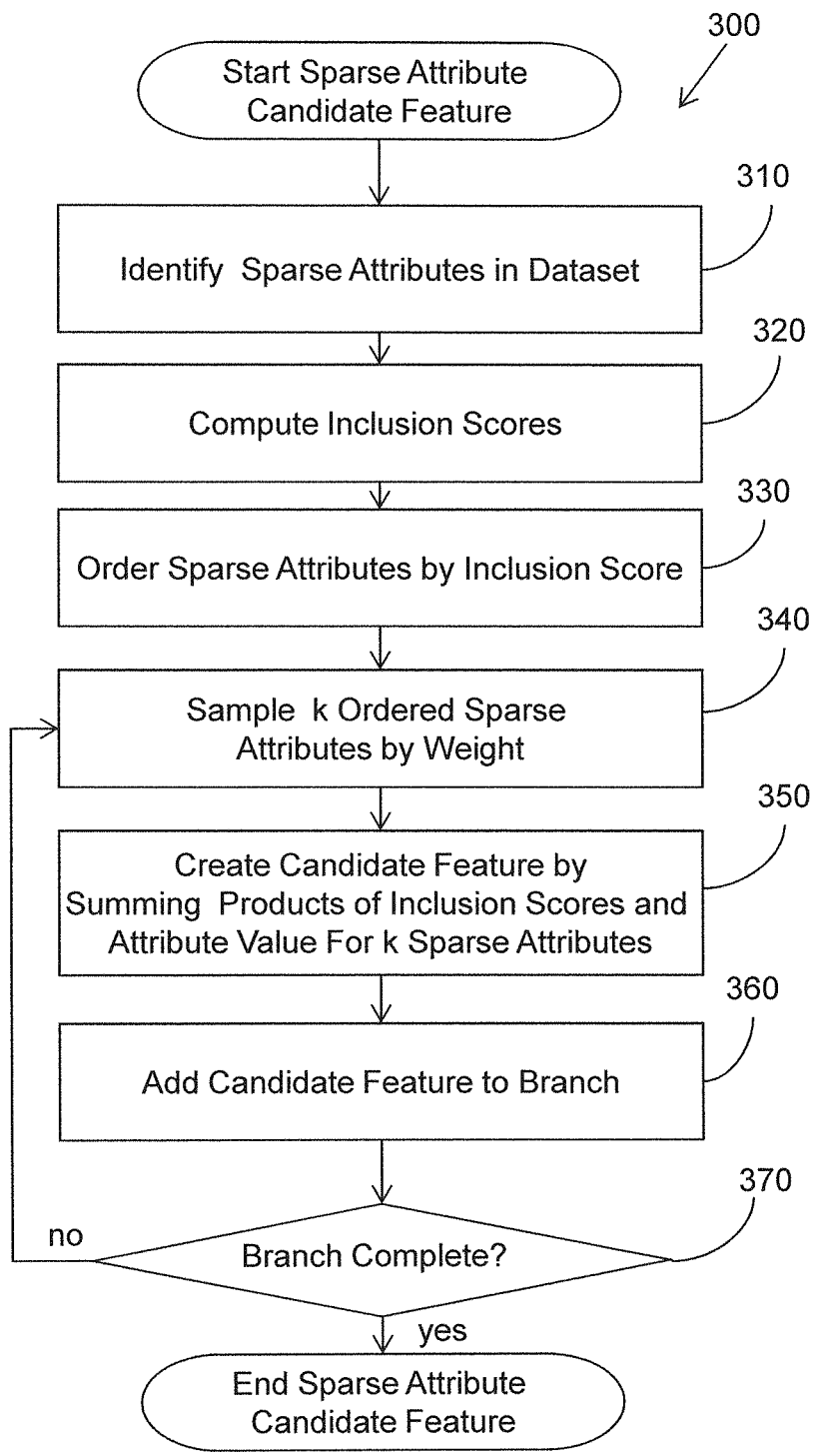
FIG. 3 illustrates an embodiment of a method associated with feature generation and model selection for GLMs.

FIG. 3 illustrates one example embodiment of a method 300 for generating candidate features for sparse input attributes. At 310, sparse attributes are identified and at 320 inclusion scores are computed for each sparse attribute. A sparse attribute list ordered in accordance with a measure of target correlation is produced at 330. At 340, k attributes are chosen by randomly sampling without replacement from the attribute list, in accordance with the sampling weights. At 350, a candidate feature is generated whose row value instance is the sum of the correlation measure multiplied by the input attribute value across each of the k chosen input attributes appearing in the row. At 360 the candidate feature is added to the branch. At 370, a determination is made as to whether the branch is complete (e.g., the maximum number of candidates per branch has been reached). If the branch is not complete, the method returns to 340.

Subsequent sets of k sparse input attributes are chosen, by sampling the ordered list. The sampling of respective sparse input attributes is weighted according to a revised sampling weight that corresponds to respective inclusion scores reduced by a predetermined factor. Subsequent candidate features whose row value instances are a sum of respective inclusion scores for respective k sparse input attributes multiplied by respective sparse input attribute values are generated. Resulting candidate features are added to the branch. In each iteration, the sampling weights of each of the k features is reduced by a factor, f<1. Once a branch has been constructed, inclusion scores for the generated candidate features can be computed and the branch may be ordered and reordered as with other input attribute types.

In one embodiment, a minimum threshold, t, is chosen on the correlation measure of an input attribute, and k is selected such that the sum of k attribute correlation measures is above a statistical significance level. The list of attribute sampling weights is initialized to the attribute's correlation measure for all attributes with correlation measure above the threshold, t.

With respect to logistic regression, the attribute values for a categorical target attribute may be binary, e.g., yes or no, 0 or 1. The attribute figure-of-merit metric for the logistic regression for this type of target attribute measures whether the target attribute's distribution differs significantly between types of input attribute values. For numeric sparse input attributes the t-statistic used in the inclusion score is the usual difference in means multiplied by the square root of n and divided by the standard deviation.

Sparse indicator input attributes are a special case of sparse attributes that have value 1 when present in a row. Sparse categorical attributes (e.g., a market basket item) are of this type. To avoid issues associated with unbalanced logistic regression target distributions, (e.g. 99% 'no'), sparse categorical input attributes are weighted inversely to the target attribute value associated with the row in which they appear. E.g., if the target attribute value distribution is 99% 'no' and 1% yes, then when input attribute A appears in the more common 'no' row, it has weight 0.01 and when an input attribute value B appears in a 'yes' row it has weight 0.99. With this weighting scheme, the sum of weights are the same in each target class, so if the input attribute sum of weights are very different between classes the attribute is significantly correlated. This is measured via a t-statistic. The weight of a present input attribute in a 'no' row, when there are a total of n rows of training data, and #yes is the number of rows with target value 'yes', is:

$$w_{no} = \frac{\#yes}{n}$$

Similarly the weight of a present attribute in a 'yes' row is:

$$w_{yes} = \frac{\#no}{n}$$

The standard error of the weights across a sample of size is:

$$\sigma_{wt} = \sqrt{\#no \times w_{no}^2 + \#yes \times w_{yes}^2}$$

The t-value (e.g., inclusion score) of attribute A (where |A| is the number of rows in which A is present is:

$$t = (\#no_A \times w_{no} - \#yes_A \times w_{yes})\sqrt{\frac{|A|}{n}}\sigma_{wt}$$

For linear regression, target correlation may be used directly for either numeric or categorical attributes.

Figure 4:
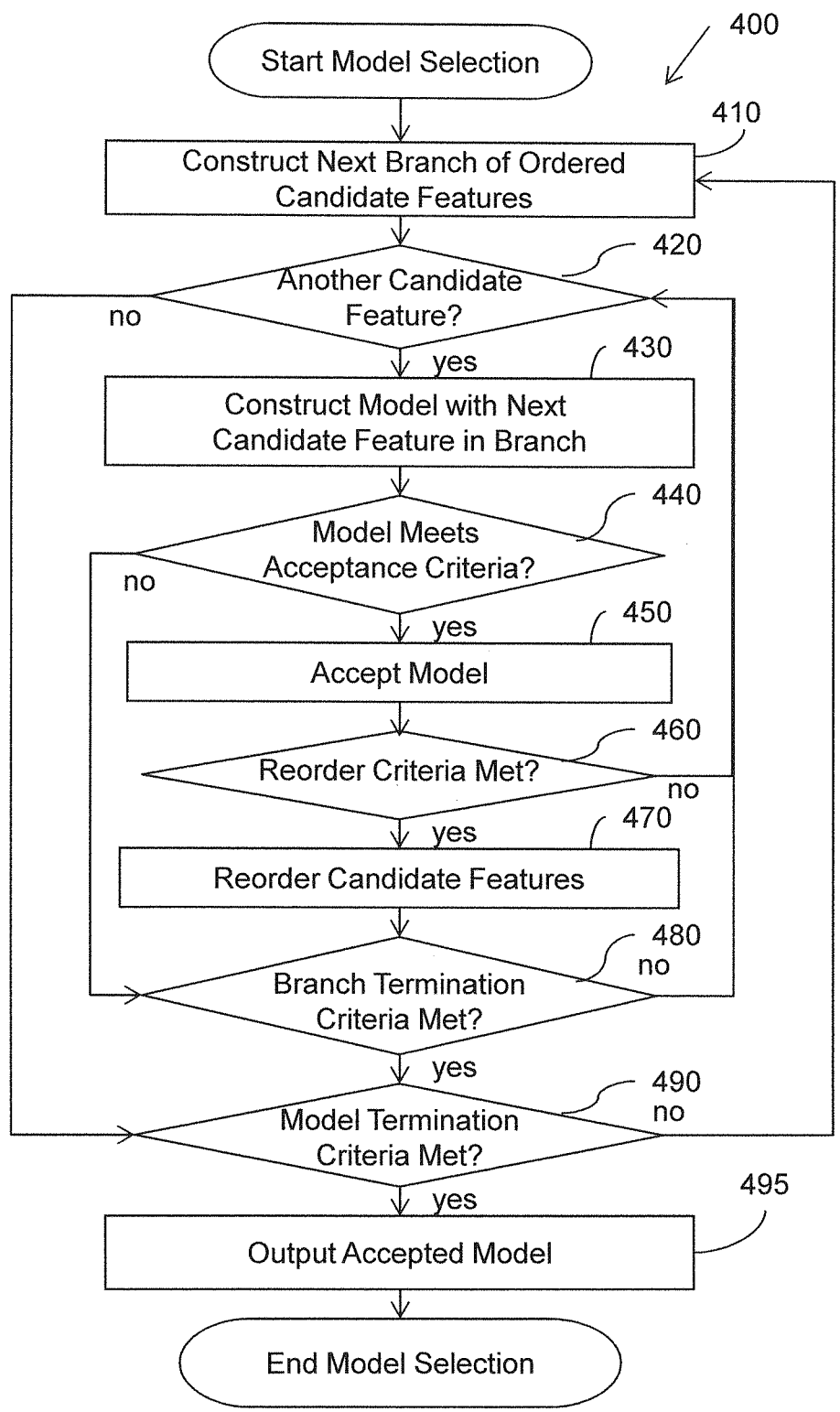
FIG. 4 illustrates an embodiment of a method associated with feature generation and model selection for GLMs.

FIG. 4 illustrates one embodiment of method 400 for performing GLM selection on a dataset that stores values for one or more input attributes and a target attribute. At 410 a branch of candidate features is constructed. Respective candidate features in the branch are ordered according to respective inclusion score. The respective inclusion scores estimate a likelihood that respective candidate features will be selected for inclusion in the GLM. As the model selection process progresses, the candidate features in the branches that are constructed at 410 may increase in complexity. For example, a first set of branches may include first order candidate features that are single input attributes, a second set of branches may include second order candidate features that are combinations of two input attributes, a third set of branches may include third order candidate features, and so on.

At 420, the method determines if there is another candidate feature in the branch that has not been considered. If no candidate features remain in the branch, the method progresses to 490 and checks model termination criteria to determine if model selection should be terminated. If the model termination criteria are not met, the method returns to 410 and another branch of candidate features is constructed.

If at 420 a candidate feature remains on the branch, the method includes, at 430, constructing a candidate GLM that includes the candidate feature. At 440, the method includes performing acceptance testing on the candidate GLM. If the candidate GLM does not meet acceptance criteria, the method progresses to 480 and branch termination criteria are checked. In one embodiment, the branch termination criteria include one or more of a failure to accept the candidate feature; a predetermined number of consecutive failures to accept candidate features; or when no remaining candidate features have a sufficiently high inclusion score.

If branch termination criteria are met at 480, no more candidate features on the branch will be checked and at 490 the model termination criteria are checked. In one embodiment, the model termination criteria include when no candidate GLMs including candidate features in a most recent branch were accepted.

When the candidate GLM meets acceptance criteria, the candidate GLM is accepted at 450 and becomes the last accepted GLM. At 460, the method determines whether reorder criteria are met. In one embodiment, the reorder criteria include a predetermined reduction in model error when the most recent candidate GLM is accepted.

When the reorder criteria are met, at 470, the method includes computing updated inclusion scores for remaining candidate features in the branch based, at least in part, on a correlation between respective candidate features and a residual error of the last accepted GLM. The remaining candidate features in the branch according are reordered to the updated inclusion scores. After reordering at 470, the method checks the branch termination criteria at 480. If the branch termination criteria are not met, the method returns to 420 to get a next candidate feature.

If the branch termination criteria are met at 480, the method checks the model termination criteria at 490. If the model termination criteria are not met, the method returns to 410 and another branch is constructed. When the model termination criteria are met, at 495 the last accepted GLM is output by the method.

In some embodiments, the acceptance criteria are based, at least in part, on penalty criteria, and the method includes selecting the penalty criteria, at least in part, on a number of rows or a number of attributes in the dataset; using the penalty criteria to compute a penalized cost of a candidate GLM; and accepting the candidate GLM when the penalized cost is less than a penalized cost for the last accepted GLM.

Caching Strategies

Having a defined path through the feature space facilitates data re-organization into objects that reduce the average bytes per scan and make better use of local cache. A path algorithm, that produces candidate feature orderings aligned with the search goals, and is tuned to the current state, can be directed by reordering heuristics to an efficient trade-off of ordering versus discovery computation.

Figure 5:
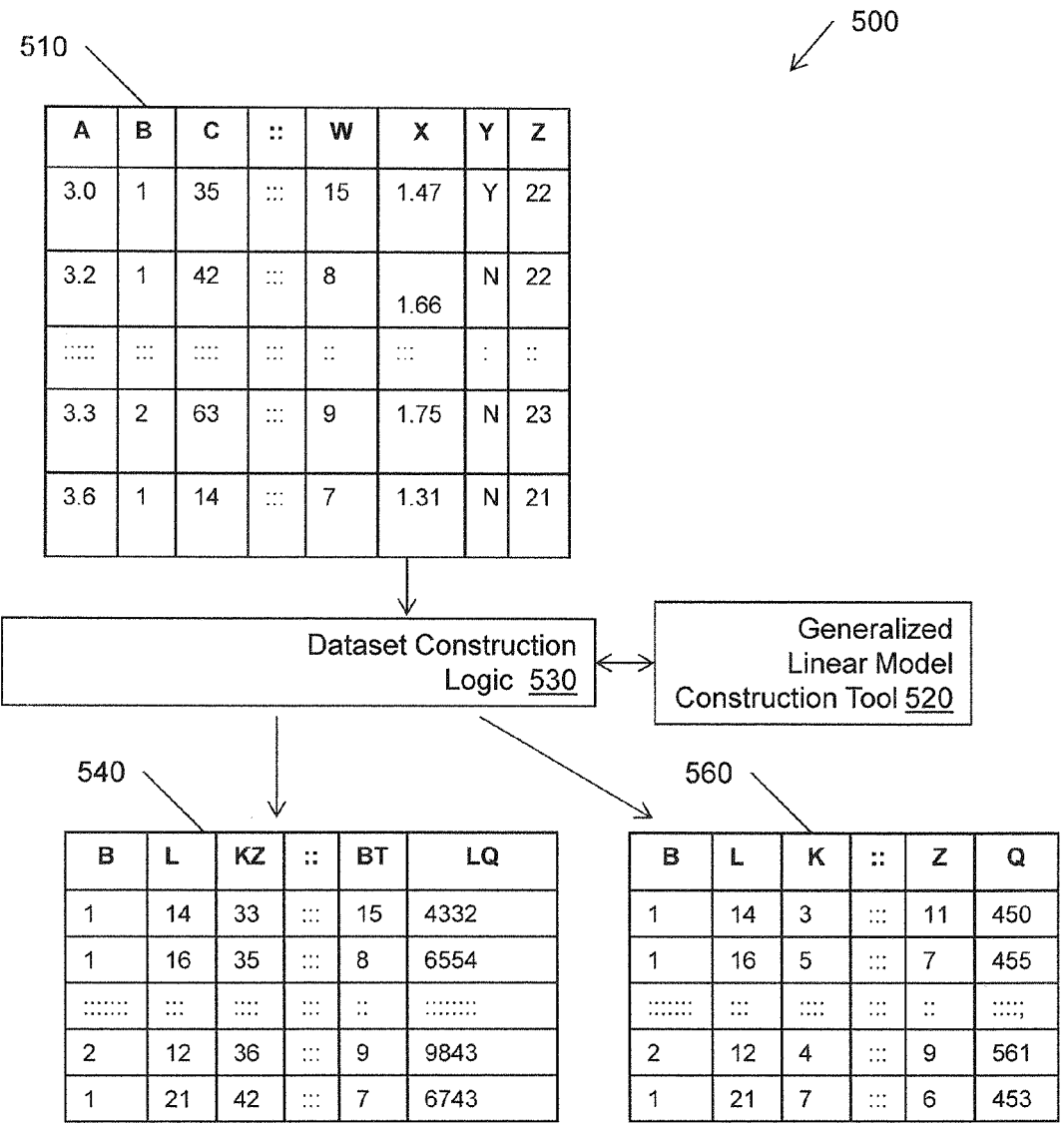
FIG. 5 illustrates another embodiment of a system associated with feature generation and model selection for GLMs.

FIG. 5 illustrates a one example embodiment of a computing system that includes a GLM construction tool 520 and a dataset construction logic 530. The dataset construction logic selects columns of a dataset 510 for inclusion in one or more working sets. The GLM construction tool 520 accesses the working sets, which may be stored in cache memory, during branch construction and model acceptance testing. The dataset construction logic 530 constructs a working set 540 that includes the top candidate features in the current order (e.g., the top 50 candidates, in one embodiment). A candidate working set 560 containing only the data required to build the next candidate model is also constructed.

A copy of the last accepted candidate working set may also be retained. The current candidate working set 560 is a copy of the last accepted candidate working set augmented by data required to construct the next feature from the working set. This scheme permits the construction of up to 50 candidates before a rescan of the original data. In addition, almost all of the new candidate features are already constructed and adjacent in the cache.

Reordering Heuristics and Branch Termination

Prior to feature generation, candidate features within a branch are re-ordered when a new working set is created. If no new candidate features have been accepted since the last re-ordering, then no new working set is created and the branch is terminated. If the partitioning policy discussed above is not in force and the top candidate feature in the branch has a score that is deemed to be not statistically significant (in one embodiment, <1.95) or is rejected during the acceptance testing phase, then branch is terminated.

When the partitioning policy is in force, the most favorable candidate in the branch construction partition may not be the most favorable candidate in the acceptance-testing partition, so it may be imprudent to terminate the phase just because the top candidate feature was rejected. Instead, the branch is terminated, if no new candidate features have been added since the last (re)-ordering and the next candidate in the branch has a score deemed not to be statistically significant (in one embodiment, <1.95).

At the outset of the feature generation phase, a new working set 540 is created. In addition, a new working set is created, and the branch re-ordered, when a candidate feature is accepted and the improvement in penalized log-likelihood is greater than a threshold (in one embodiment, the threshold is 5.00). In addition, a branch or phase is terminated, if threshold number of consecutive candidates fail acceptance (in one embodiment, the threshold is 50).

Embedded Elements of Standard Statistical Practice

In some embodiments, as a practical matter elements of accepted statistical practice are used by the GLM construction tool 520. These elements include accommodating user-supplied row weights in the computation of ordering statistics, block selection, inclusion of lower order sub-terms when generating interactions, and treating numeric components of interactions, so as to avoid collinearity with lower order features that include them, and pruning.

Block selection is an option sometimes applied by analysts to categorical candidate features. Categorical features take on values that are categories, such as red, green or yellow, rather than numbers. The algorithm requires numeric data, so the standard approach is to create a set of indicator variables that take on the values: 0=absent, 1=present, for each category, e.g. to represent color='red', values may be [color_red=1, color_green=0, color_yellow=0].

Block selection is a process in which the entire collection of indicators is tested as a group. The representation described above is redundant. The color='red' could also be represented by [color_green=0, color_yellow=0], since red must be present if green and yellow are not. Redundancy results in an exact multi-collinearity that would cause the algorithm to fail. Thus, standard practice removes the most frequently present indicator. To address this issue, the non-zero count is the sum of the indicator values over the block, and the score is the highest score achieved by any indicator in the block.

Block selection is an option. By default it is not enabled. The default behavior has a complete set of indicator variables included in the candidate pool, that are each treated independently. To avoid the potential for a candidate with a huge number of components, feature generation is disallowed when block selection is enabled.

It is common practice to include lower order components when incorporating a product in a model. Consider a feature that is the product of three base attributes, e.g., A, B and C. Then one includes 7 terms: A, B, C, A*B, A*C, B*C and A*B*C. Any of the 6 lower order components not currently in the model are constructed and tested along with the full interaction term (A*B*C). Failures during the post model build phase increase both the number of candidates tested and the number of consecutive failures. An exception occurs when candidate includes lower order components.

Initially, both the candidate feature and all missing lower order components are included in the acceptance test simultaneously. If the candidate feature group is rejected, then the candidate feature is re-tested by itself. If the candidate feature group is accepted, then its components are checked for statistical significance. If a subset of the components fails the significance test, that subset is removed from the group and the group is re-tested. The process is repeated until all group members are significant or the entire group is rejected. Only at this point does failure result in an increase in the number of candidate features tested and the number of consecutive failures.

The statistical separation between the truly target-correlated features and features unrelated to the target is important to model accuracy. Unfortunately, in general, it is not known which features are truly target-correlated. The p-values are used as surrogate measures of statistical separation.

For efficiency, the candidate feature generation and selection phase is a forward process. Candidate features are selectively added to the model. However, correlation among the candidate features can weaken the significance of individual contributions. Therefore, after the candidate feature generation and selection phase is complete, candidate features with p-values above a threshold are pruned and the model is rebuilt. This is done in a loop until all remaining features are significant. Pruning is an option that can be enabled or disabled by the user.

An analyst may want to force inclusion of specific candidate features into the model. Thus, in some embodiments, this is an allowed option, provided that the candidate features are input attributes. When input attributes are forced-in, an initial model is constructed consisting of just these input attributes. It becomes the baseline model. The candidate feature generation and selection phase begins with this baseline. Forced-in input attributes are never pruned. However, if forced-in input attributes cause critical operations to fail, such as making a matrix non-invertible, an error is thrown.

General Computer Embodiment

Figure 6:
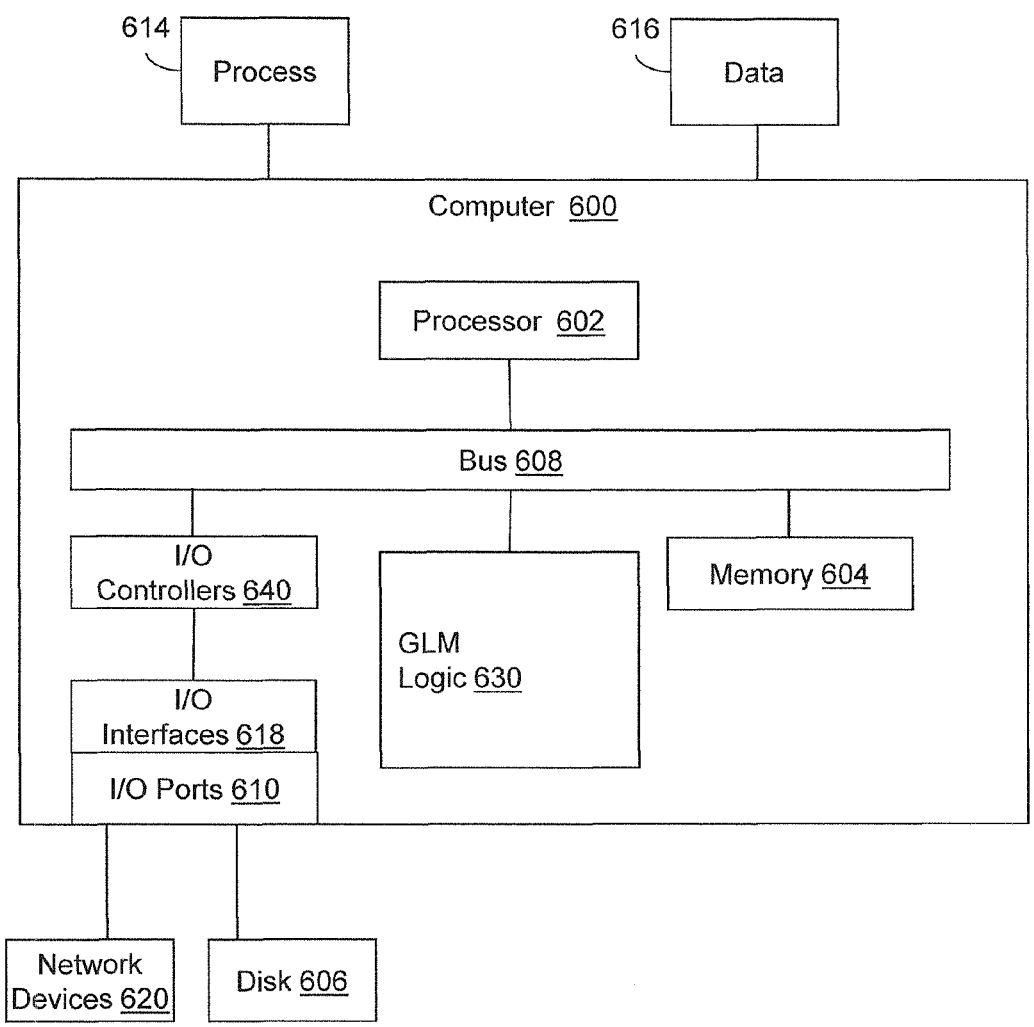
FIG. 6 illustrates an embodiment of a computing system in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a GLM logic 630 configured to facilitate GLM feature generation and model selection. In different examples, the GLM logic 630 may be implemented in hardware, a non-transitory computer-readable medium with stored instructions, firmware, and/or combinations thereof. While the logic 630 is illustrated as a hardware component attached to the bus 608, it is to be appreciated that in one example, the logic 630 could be implemented in the processor 602.

In one embodiment, logic 630 is a means (e.g., hardware, non-transitory computer-readable medium, firmware) for performing GLM feature generation and model selection.

The means may be implemented, for example, as an ASIC programmed to perform GLM feature generation and model selection. The means may also be implemented as stored computer executable instructions that are presented to computer 600 as data 616 that are temporarily stored in memory 604 and then executed by processor 602.

GLM Logic 630 may also provide means (e.g., hardware, non-transitory computer-readable medium that stores executable instructions, firmware) for performing the methods outlined in FIGS. 2-4.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data on a non-transitory computer readable medium. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, a non-transitory computer readable medium that stores instructions, and/or combinations of each to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "criteria" is employed in a grammatically plural sense in the detailed description or the claims, it is intended to be inclusive of both the singular "criterion" and the plural "criteria."

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method comprising:
    identifying a dataset that stores values for a target attribute and input attributes, where the input attributes are under consideration for inclusion in a generalized linear model that predicts a value of the target attribute based on a selection of features, where each feature comprises a combination of one or more of the input attributes;
    identifying candidate features, where a candidate feature comprises a combination of one or more of the input attributes;
    computing respective inclusion scores for respective candidate features, based, at least in part on a likelihood that the candidate feature will be selected for inclusion in the generalized linear model;
    ordering the candidate features according to inclusion score;
    constructing a set of one or more branches of candidate features, where each branch includes candidate features ordered according to inclusion score from highest inclusion score to lowest inclusion score, where the one or more branches do not include candidate features having an inclusion score below a predetermined minimum score; and
    providing a branch of candidate features to a streamwise feature selection process configured to construct the generalized linear model by considering candidate features in the branch, in turn, starting with the candidate feature with the highest inclusion score, and including selected candidate features in the generalized linear model.

2. The computer-implemented method of claim 1, comprising computing the inclusion scores for a branch in a single scan of the input attributes.

3. The computer-implemented method of claim 1, comprising providing one or more termination criteria to the streamwise feature selection process such that when the termination criteria are met, consideration of candidate features in a branch by the streamwise feature selection process is terminated, where the termination criteria are based, at least in part, on one or more of:
    a failure to accept a candidate feature having a highest inclusion score;
    a predetermined number of consecutive failures to accept candidate features having next highest inclusion scores; and
    when no remaining candidate features have a sufficiently high inclusion score, such that a lower bound on a penalized cost of a candidate model is less than a penalized cost of a last accepted model.

4. The computer-implemented method of claim 1, comprising:
    determining that one or more candidate features in a branch have been accepted for inclusion in the generalized linear model;
    computing updated inclusion scores for remaining candidate features in the branch that have not yet been provided to the streamwise feature selection process;
    where the updated inclusion scores are computed based, at least in part, on a correlation between respective candidate features and a residual error of a last accepted generalized linear model that includes the one or more accepted candidate features; and
    providing the remaining candidate features to the streamwise feature selection process in order of updated inclusion scores.

5. The computer-implemented method of claim 1, further comprising
    upon termination by the streamwise feature selection process of consideration of candidate features in the branch, identifying candidate features that were accepted by the streamwise selection process, and constructing subsequent branches by:
        generating one or more branches of candidate features using remaining input attributes that have not been considered for inclusion in a branch, or
        generating a set of one or more second order branches of new candidate features by combining, for each branch in the set of second order branches, an accepted candidate feature with the input attributes;
    computing respective inclusion scores for respective new candidate features in the subsequent branch, based, at least in part on a likelihood that the new candidate feature will be selected for inclusion in the generalized linear model;
    constructing the subsequent branch of new candidate features ordered according to inclusion score; and
    providing the subsequent branch of candidate features, in order of inclusion score, to the streamwise feature selection process.

6. The computer-implemented method of claim 5, where candidate features in the second order branches comprise respective candidate features that are the product of an accepted candidate feature and respective input attributes.

7. The computer-implemented method of claim 6, comprising:
    upon termination by the streamwise feature selection process of the second order branches, constructing a set of one or more third order branches by:
    identifying second order candidate features that were accepted by the streamwise selection process;
    generating branches of respective third order candidate features by combining, for each third order branch, an accepted second order candidate feature with respective input attributes;
    computing respective inclusion scores for respective third order candidate features in the subsequent branch, based, at least in part on a likelihood that the third order candidate feature will be selected for inclusion in the generalized linear model;
    constructing the third order branch of new candidate features ordered according to inclusion score; and
    providing the third order branch of candidate features, in order of inclusion score, to the streamwise feature selection process.

8. The computer-implemented method of claim 5, where respective inclusion scores are based, at least in part, on a correlation between respective candidate features and i) residual errors a last accepted generalized linear model or ii) last iteration working residuals of a last accepted generalized linear model.

9. The computer-implemented method of claim 6, further comprising terminating the streamwise feature selection process when all branches meet one or more termination criteria.

10. The computer-implemented method of claim 1, where the streamwise feature selection process performs acceptance testing to select candidate features by:

constructing a candidate generalized linear model that includes a next candidate feature in the branch;

comparing the candidate generalized linear models to a last accepted generalized linear model;

accepting the candidate generalized linear model when acceptance criteria are met, where the acceptance criteria are based, at least in part, on a penalty criterion; further where the penalty criterion is selected, at least in part, on characteristics of the dataset; and where the streamwise feature selection process uses the penalty criterion to compute a penalized cost of a candidate generalized linear model and accepts the candidate generalized linear model when the penalized cost is less than a penalized cost for the last accepted generalized linear model.

11. The computer-implemented method of claim 10 where the characteristics of the dataset comprise one or more of: a number of rows and a number of input attributes.

12. The computer-implemented method of claim 1, further comprising:

partitioning the dataset into a first partition and a second partition;

computing inclusion scores using input attribute values and target attribute values in the first partition; and further where the streamwise feature selection process tests candidate features for inclusion in the generalized linear model using input attribute values and target attribute values in the second partition.

13. The computer-implemented method of claim 1, comprising, when the target attribute is numeric, calculating an initial inclusion score for a candidate feature based on a correlation of the candidate feature to the target attribute.

14. The computer-implemented method of claim 1, comprising, when the target attribute is categorical, calculating an initial inclusion score for a candidate feature based on a t-statistic computed from a sample difference in values of the candidate feature by target attribute class.

15. The computer-implemented method of claim 1, further comprising:

identifying a maximum branch size, where the branch size is a fixed value, less than or equal to the number of input attributes in the dataset; and limiting a size of branches to the maximum branch size.

16. The computer-implemented method of claim 1, further comprising constructing a candidate dataset by storing, in cache memory:

a portion of the dataset corresponding to input attribute values that are combined in candidate features included in a last accepted generalized linear model; and a portion of the dataset corresponding to input attribute values that are combined in a next candidate feature in the branch.

17. The computer-implemented method of claim 16, further comprising constructing the candidate dataset by storing, in cache memory, a portion of the dataset corresponding to input attribute values that are combined in a set of candidate features having highest inclusion scores.

18. The computer-implemented method of claim 1, comprising:

identifying sparse input attributes in the dataset;

computing respective inclusion scores for respective sparse input attributes;

creating an ordered list of sparse input attributes having an inclusion score higher than a threshold sparse input attribute inclusion score;

choosing a set of k sparse input attributes, by sampling the ordered list, where the sampling of respective sparse input attributes is weighted according to respective inclusion scores;

constructing a candidate feature whose row value instance is a sum of respective inclusion scores for respective k sparse input attributes multiplied by respective sparse input attribute values; and adding the candidate feature to the branch.

19. The computer-implemented method of claim 18, further comprising:

choosing a subsequent set of k sparse input attributes, by sampling the ordered list, where the sampling of respective sparse input attributes is weighted according to a sampling weight comprising respective inclusion scores reduced by a predetermined factor;

constructing a candidate feature whose row value instance is a sum of respective inclusion scores for respective k sparse input attributes multiplied by respective sparse input attribute values; and adding the candidate feature to the branch.

20. A computing system, comprising:

a branch construction logic configured to:

identify a dataset that stores values for a target attribute and input attributes identifying candidate features, where a candidate feature comprises a combination of one or more input attributes;

compute respective inclusion scores for respective candidate features in the branch, based, at least in part on a likelihood that the candidate feature will be selected for inclusion in a generalized linear model that combines selected candidate features to predict a value of the target attribute;

order the candidate features according to inclusion score; and construct a branch of candidate features ordered according to inclusion score from highest inclusion score to lowest inclusion score, where the branch does not include candidate features having an inclusion score below a predetermined minimum score; and a streamwise feature selection logic configure to construct the generalized linear model by performing acceptance testing on candidate generalized linear models that include a next candidate feature in the branch, where candidate generalized linear models are compared to a last accepted generalized linear model and a candidate generalized linear model is accepted when one or more acceptance criteria are met.

21. The computing system of claim 20, where the branch construction logic is configured to:

determine that one or more candidate features in a branch have been accepted for inclusion in the generalized linear model;

compute updated inclusion scores for remaining candidate features in the branch that have not yet been provided to the streamwise feature selection process;

where the updated inclusion scores are computed based, at least in part, on a correlation between respective candidate features and a residual error of the last accepted generalized linear model that includes the one or more accepted candidate features; and re-order the remaining candidate features in the branch according to updated inclusion scores.

22. The computing system of claim 20, further comprising:

an acceptance criteria logic configured to select the acceptance criteria based, at least in part, on a penalty criterion, where the acceptance criteria logic is configured to select the penalty criterion, at least in part, on characteristics of the dataset; and where the streamwise feature selection logic is configured to use the penalty criterion to compute a penalized cost of a candidate generalized linear model and accept the candidate generalized linear model when the penalized cost is less than a penalized cost for the last accepted generalized linear model.

23. The computing system of claim 20, further comprising a dataset construction logic configured to construct a working dataset by storing, in cache memory, one or more of:

a portion of the dataset corresponding to input attribute values that are combined in candidate features included the last accepted generalized linear model; and a portion of the dataset corresponding to input attribute values that are combined in a next candidate feature in the branch; and a portion of the dataset corresponding to input attribute values that are combined in a set of candidate features having highest inclusion scores.

24. A non-transitory computer-readable medium storing computer-executable instructions that when executed by a computer cause the computer to at least:

identify a dataset that stores values for one or more input attributes and a target attribute;

until one or more model termination criteria are met, construct a set of branches, where each branch comprises candidate features ordered according to respective inclusion score, where a candidate features comprises a combination of one or more input attributes, further where respective inclusion scores estimate a likelihood that respective candidate features will be selected for inclusion in a generalized linear model that comprises a combination of features that predict the target attribute;

until one or more branch termination criteria are met for each branch in the set of branches:

construct a candidate generalized linear model that includes a next candidate feature in the branch;

perform acceptance testing on the candidate generalized linear model such that when the candidate generalized linear model meets acceptance criteria, the candidate generalized linear model is accepted;

when one or more reorder criteria are met, compute updated inclusion scores for remaining candidate features in the branch based, at least in part, on a correlation between respective candidate features and a residual error of the last accepted generalized linear model;

re-order the remaining candidate features in the branch according to updated inclusion scores; and when branch termination criteria are met for the branch, access a next branch in the set of branches; and provide the last accepted generalized linear model as an output.

25. The non-transitory computer-readable medium of claim 24, where the acceptance criteria are based, at least in part, on a penalty criterion, further where the instructions further comprise instructions configured to cause the computer to:

select the penalty criterion, at least in part, on a number of rows or a number of attributes in the dataset;

use the penalty criterion to compute a penalized cost of a candidate generalized linear model; and accept the candidate generalized linear model when the penalized cost is less than a penalized cost for the last accepted generalized linear model.

26. The non-transitory computer-readable medium of claim 24, where the instructions comprise instructions configured to cause the computer to compute inclusion scores for candidate features using data in a first data partition and perform acceptance testing on the candidate generalized linear model using data in a second data partition.

27. The non-transitory computer-readable medium of claim 24, where the branch termination criteria comprise one or more of:

a failure to accept a candidate feature having a highest inclusion score;

a predetermined number of consecutive failures to accept candidate features having next highest inclusion scores; and when no remaining candidates have a sufficiently high inclusion score.

28. The non-transitory computer-readable medium of claim 24, where the reorder criteria comprise a predetermined reduction in model error when a most recent candidate generalized linear model is accepted.

29. The non-transitory computer-readable medium of claim 24, where the model termination criteria comprise terminating when branch termination criteria have been met for all branches.

30. A non-transitory computer-readable medium storing computer-executable instructions that when executed by a computer cause the computer to at least:

identify a dataset that stores values for a target attribute and input attributes, where the input attributes are under consideration for inclusion in a generalized linear model that predicts a value of the target attribute based on a selection of features, where each feature comprises a combination of one or more of the input attributes;

identify candidate features, where a candidate feature comprises a combination of one or more of the input attributes;

compute respective inclusion scores for respective candidate features, based, at least in part on a likelihood that the candidate feature will be selected for inclusion in the generalized linear model;

order the candidate features according to inclusion score;

construct a set of one or more branches of candidate features, where each branch includes candidate features ordered according to inclusion score from highest inclusion score to lowest inclusion score, where the one or more branches do not include candidate features having an inclusion score below a predetermined minimum score; and provide a branch of candidate features to a streamwise feature selection process configured to construct the generalized linear model by considering candidate features in the branch, in turn, starting with the candidate feature with the highest inclusion score, and including selected candidate features in the generalized linear model.

31. The non-transitory computer-readable medium of claim 30, where the instructions include instructions configured to cause the computer to provide one or more termination criteria to the streamwise feature selection process such that when the termination criteria are met, consideration of candidate features in a branch by the streamwise feature selection process is terminated, where the termination criteria are based, at least in part, on one or more of:

a failure to accept a candidate feature having a highest inclusion score;

a predetermined number of consecutive failures to accept candidate features having next highest inclusion scores; and when no remaining candidate features have a sufficiently high inclusion score, such that a lower bound on a penalized cost of a candidate model is less than a penalized cost of a last accepted model.

32. The non-transitory computer-readable medium of claim 30, where the instructions comprise instructions configured to cause the computer to:

determine that one or more candidate features in a branch have been accepted for inclusion in the generalized linear model;

compute updated inclusion scores for remaining candidate features in the branch that have not yet been provided to the streamwise feature selection process;

where the updated inclusion scores are computed based, at least in part, on a correlation between respective candidate features and a residual error of a last accepted generalized linear model that includes the one or more accepted candidate features; and provide the remaining candidate features to the streamwise feature selection process in order of updated inclusion scores.

33. A computer-implemented method, comprising:

identifying a dataset that stores values for one or more input attributes and a target attribute;

until one or more model termination criteria are met, constructing a set of branches, where each branch comprises candidate features ordered according to respective inclusion score, where a candidate features comprises a combination of one or more input attributes, further where respective inclusion scores estimate a likelihood that respective candidate features will be selected for inclusion in a generalized linear model that comprises a combination of features that predict the target attribute;

until one or more branch termination criteria are met for each branch in the set of branches:

constructing a candidate generalized linear model that includes a next candidate feature in the branch;

performing acceptance testing on the candidate generalized linear model such that when the candidate generalized linear model meets acceptance criteria, the candidate generalized linear model is accepted;

when one or more reorder criteria are met, computing updated inclusion scores for remaining candidate features in the branch based, at least in part, on a correlation between respective candidate features and a residual error of the last accepted generalized linear model;

re-ordering the remaining candidate features in the branch according to updated inclusion scores; and when branch termination criteria are met for the branch, accessing a next branch in the set of branches; and providing the last accepted generalized linear model as an output.

34. The computer-implemented method of claim 33, where the acceptance criteria are based, at least in part, on a penalty criterion, where the method further comprises:

selecting the penalty criterion, at least in part, on a number of rows or a number of attributes in the dataset;

using the penalty criterion to compute a penalized cost of a candidate generalized linear model; and accepting the candidate generalized linear model when the penalized cost is less than a penalized cost for the last accepted generalized linear model.

35. The computer-implemented method of claim 33, further comprising computing inclusion scores for candidate features using data in a first data partition and performing acceptance testing on the candidate generalized linear model using data in a second data partition.

36. The computer-implemented method of claim 33, where the branch termination criteria comprise one or more of:

a failure to accept a candidate feature having a highest inclusion score;

a predetermined number of consecutive failures to accept candidate features having next highest inclusion scores; and when no remaining candidates have a sufficiently high inclusion score.

37. The computer-implemented method of claim 33, where the reorder criteria comprise a predetermined reduction in model error when a most recent candidate generalized linear model is accepted.

38. The computer-implemented method of claim 33, where the model termination criteria comprise terminating when branch termination criteria have been met for all branches.

* * * * *